Aug. 15, 1944.  A. H. EBERMAN  2,355,714
APPARATUS FOR MAKING FILTERS
Filed April 4, 1942  4 Sheets-Sheet 1
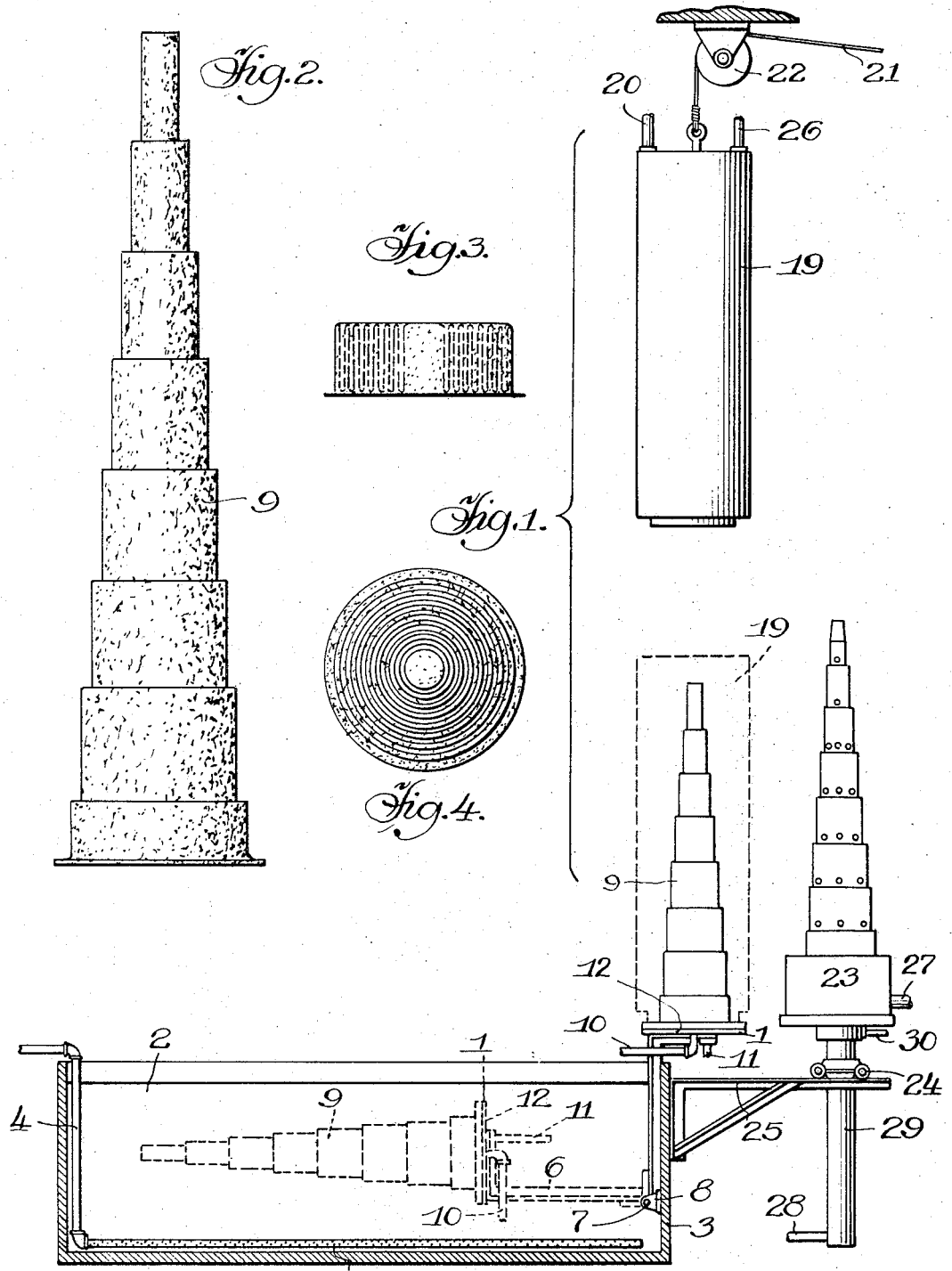
INVENTOR.
Augustus H. Eberman,
BY Parkinson & Lane
Attys.
Witness:
Chas. L. Koursh

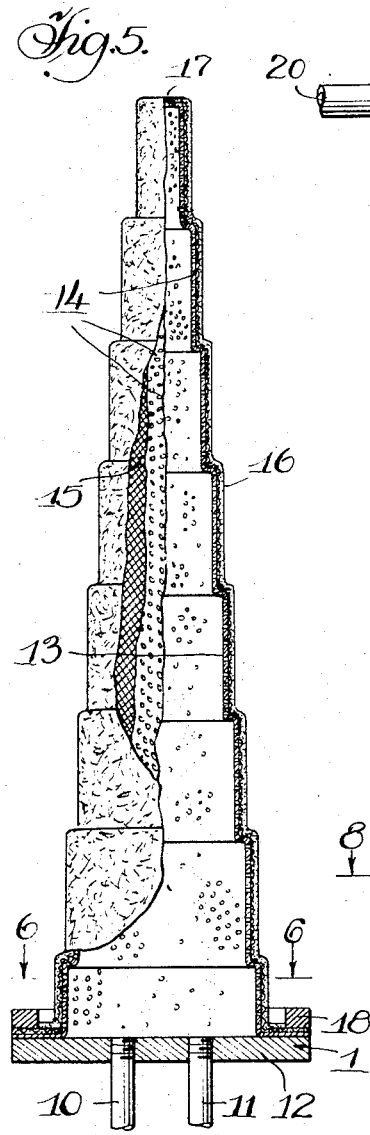
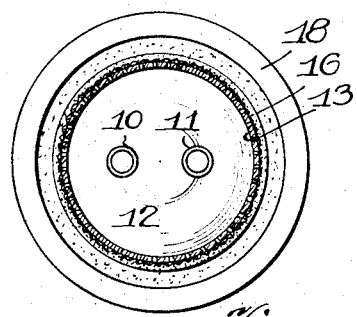
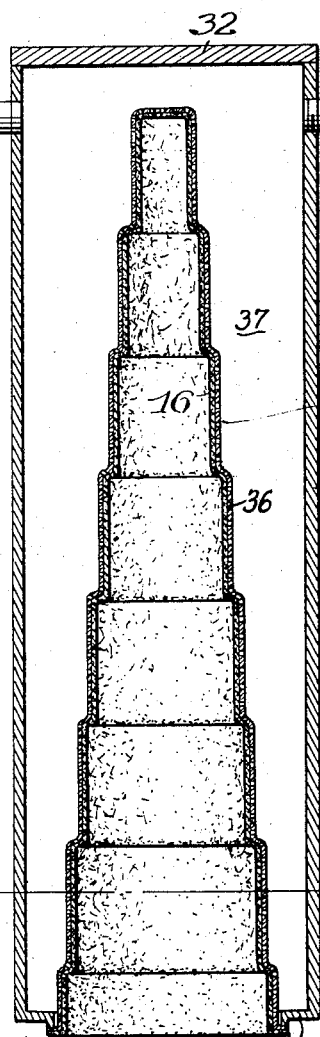
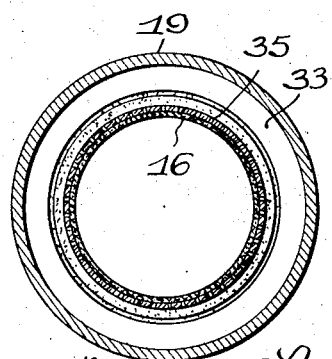
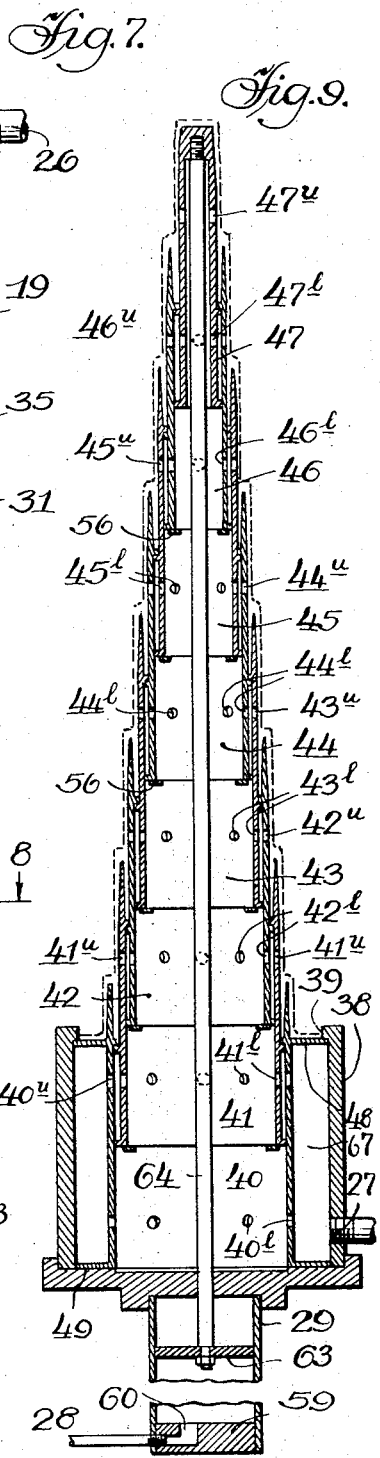

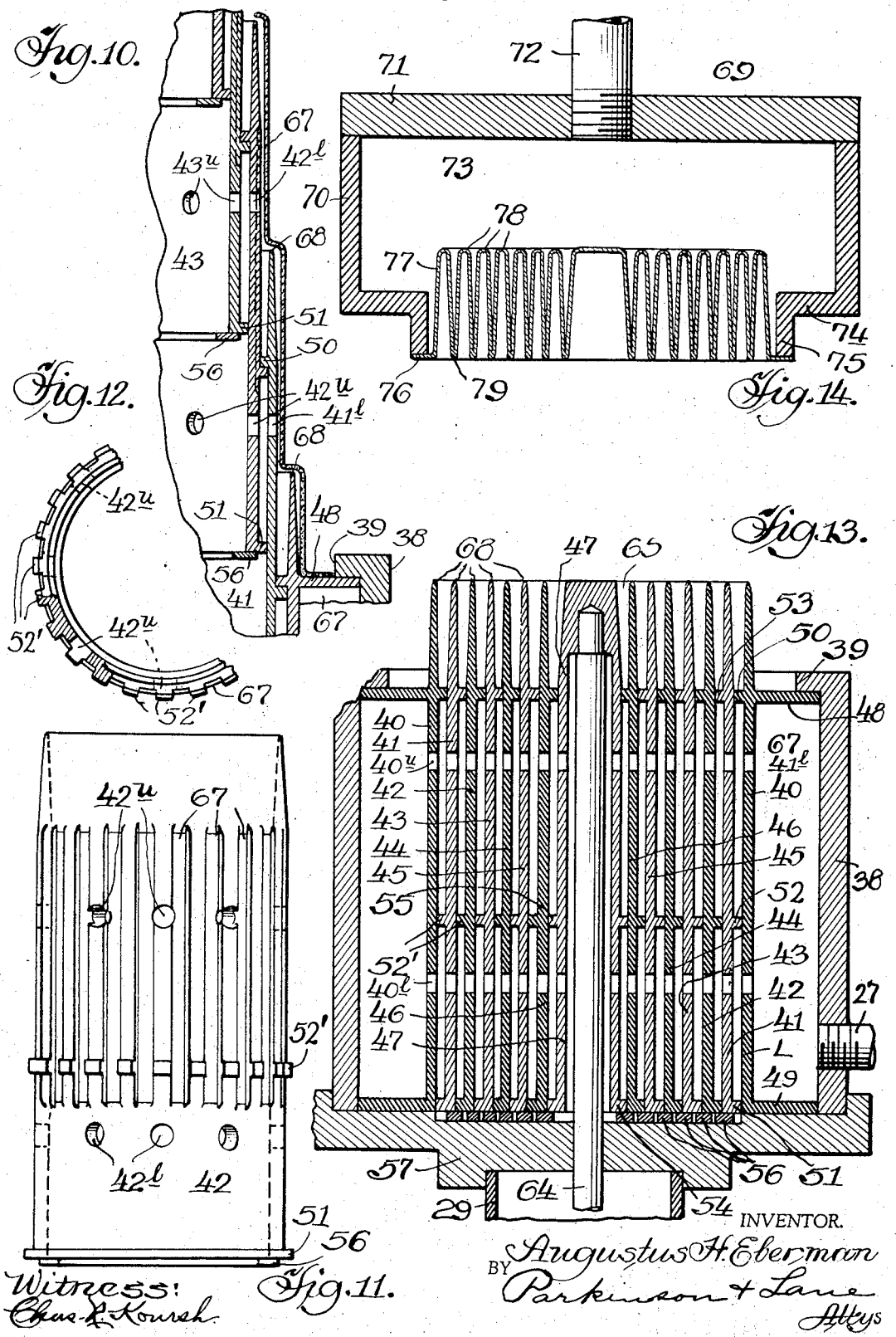

Aug. 15, 1944.    A. H. EBERMAN    2,355,714
APPARATUS FOR MAKING FILTERS
Filed April 4, 1942    4 Sheets-Sheet 4

INVENTOR.
Augustus H. Eberman,
BY Parkinson & Lane
Attys

Witness:
Chas. R. Hursh.

Patented Aug. 15, 1944

2,355,714

UNITED STATES PATENT OFFICE 2,355,714

APPARATUS FOR MAKING FILTERS

Augustus H. Eberman, Geneva, Ill., assignor to Jesse B. Hawley, Geneva, Ill.

Application April 4, 1942, Serial No. 437,618

17 Claims. (Cl. 92—54)

This invention relates to an apparatus for making filters, and more particularly to a filter made by accreting fibrous pulp onto a porous former in a pulp bath, removing the filter carcass from the former, and turning spaced portions of the carcass inside out to form a folded filter of fibrous material having large superficial area within a small space, the fibers having filtering interstices therebetween and being of sufficient strength to withstand any normal pressure to which it may be subjected during filtering operation.

The invention of this application is an improvement over that disclosed in the copending application of Edward C. Sloan and myself, Serial No. 219,454, filed July 15, 1938, now Patent 2,337,574, issued December 28, 1943.

The filter of the present application is especially adapted for filtering air, gas or the like, but is capable of use in filtering other fluids.

Among the objects of my invention is to provide a novel filter for filtering air or other fluids, and having closely positioned, folded, concentric sections through the porous walls of which air or other fluids may readily pass from one side of the filter to the other.

Another object is to provide a folded filter having a large facial area, but occupying a small, overall space, and of sufficient strength to withstand any normal pressure to which it may be subjected in operation.

A further object is to provide improved apparatus for folding and forming such filter.

A still further object is to provide a novel form of transfer device for transferring the wet carcass after it has been folded to the drying form in the dryer.

Another object is to provide novel means for removing the folded dried carcass from the drying form after drying.

A further object is to provide a novel drying form.

A still further object is to provide a novel method of folding various sections of the carcass of the filter and handling the same after being folded.

Other objects, advantages and capabilities such as are inherently possessed by my invention will later more fully appear.

My invention further resides in the combination, construction and arrangement of parts illustrated in the accompanying drawings, and while I have shown therein preferred embodiments, I wish it understood that the same are susceptible of modification and change without departing from the spirit of my invention.

In the drawings:

Figure 1 is a vertical transverse section, parts in elevation and parts shown diagrammatically, of the pulp bath tank, the porous former, the folder and the transfer device for transferring the wet fibrous carcass from the former to the folder.

Fig. 2 is a side elevation of the accreted fibrous carcass before being folded.

Fig. 3 is a side elevation of such carcass after being folded.

Fig. 4 is a bottom plan view of Fig. 3.

Fig. 5 is a side view, partly in vertical section, partly in side elevation and partly broken away, of the felting form or felter with an accreted carcass thereon.

Fig. 6 is a horizontal transverse section taken on the line 6—6 of Fig. 5.

Fig. 7 is a vertical longitudinal section through the unfolded carcass transfer showing the felter and a felted carcass therein.

Fig. 8 is a horizontal transverse section on the line 8—8 of Fig. 7.

Fig. 9 is a longitudinal vertical section of the folder in extended position with the bottom portion partly broken away.

Fig. 10 is a fragmentary vertical longitudinal section of a lower portion of the folder in extended position.

Fig. 11 is a side elevation of one of the lower telescoping sections of the folder.

Fig. 12 is a fragmentary plan view, partly broken away, of the telescoping section shown in Fig. 11.

Fig. 13 is a fragmentary vertical section of the telescoping portion of the folder, partly broken away, and showing the parts in collapsed position.

Fig. 14 is a vertical section of the folded filter transfer.

Figure 15:
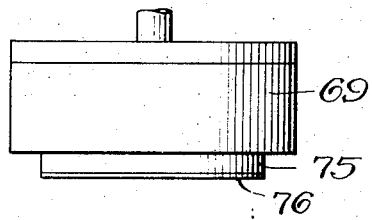
Fig. 15 is a side elevation of the transfer of Fig. 14, but on a smaller scale.

Referring in detail to the drawings, Fig. 1 shows a felter or feltering former 1 lowered into a fibrous pulp bath 2 contained within the tank 3, provided with a pipe 4 having in the bottom of the tank a perforated extension 5 through the perforations of which air under pressure may be passed to agitate the contents of the tank. The felter 1 is carried by an arm 6 pivotally mounted at 7 to a bracket 8 fixed to the tank wall so that the felter may be lowered into the bath 2 as shown by dotted lines in Fig. 1 and after having accreted thereon, by suction or pressure differential, a filter carcass 9 may be swung upwardly into upright position as shown in full lines in Fig. 1.

Suction will be applied to the interior of the porous felter 1 through pipe 10 from any suitable source to suck or draw the water of the pulp bath through the perforated walls of the felter and deposit fibers in the bath upon the outer surface of the felter to any desired thickness, which thickness may be controlled in any suitable manner. The walls of the felter are provided with a large number of openings of suitable size, which openings may be covered with any suitable porous material for preventing the fibers from passing through the openings but yet permitting the liquid of the bath to do so. Such porous covering may be fine mesh wire cloth, or any other suitable material. The felter is also provided with an air pipe 11 connected with any suitable source of compressed air to enable air to be forced into the felter to assist in removing the filter carcass from the felter as later more fully described.

The filter elements are made of any suitable fibers such as vegetable, mineral or animal fibers, and preferably vegetable fibers such as wood fibers, cotton fibers or the like. Asbestos fibers and synthetic or artificial fibers or any other suitable fibers may be used if desired, it being essential that the fibrous material used be capable of being made into porous forms with sufficient filtering interstices between the fibers. Mixtures of various fibers may also be used if desired. The large end of the felter will be closed by the plate 12 which is imperforate except for the pipes 10 and 11. A longitudinal section through one side of the felter is seen in Fig. 5, the inner portion being formed preferably of a metal tube 13 having extending through its walls a large number of openings 14 over which is placed a wire mesh cloth 15 to prevent the pulp from passing through said openings. The accreted carcass 16 is seen as overlying the wire mesh cloth. The felter is shown in Fig. 5 as formed with a plurality of stepped portions each of smaller diameter from the one preceding it, but if desired the felter may be tapered from one end to the other as the frustum of a cone without departing from the spirit of my invention. The carcass 16 is closed at the top 17, and the wire mesh cloth 15 at the bottom of the felter is clamped in place between the clamping ring 18 and the end plate 12.

When a carcass of desired thickness is accreted on the felter, the suction through pipe 10 is preferably continued as the felter is being swung upwardly out of the bath to prevent the accreted fibers thereon from being washed off by the movement through the water. The suction may be continued for a short time after that if it is desired to remove more water from the wet carcass. At the desired time the suction will be cut off. When the felter with its carcass accreted thereon is in upright position as shown in solid lines in Fig. 1, the transfer member 19 is lowered down over the wet carcass into the position shown in dotted lines in Fig. 1. The suction in the felter having then been shut off, air is introduced through the pipe 11 to assist in blowing the carcass loose from the felter simultaneously with the introduction of suction into the interior of the transfer 19 through pipe 20, which causes the carcass to adhere to the interior of the transfer member. The transfer member may now be elevated away from the felter by the cable 21 connected thereto and passing over the pulley 22 to any suitable hoisting element (not shown).

The felter 1 is now again swung back into the bath to have another carcass accreted thereonto in a manner similar to that previously described, and the folder 23 is then moved on its carriage 24 along track 25 into position directly below the transfer member which is now lowered thereover and the suction through pipe 20 cut off. Air under desired pressure is then introduced through pipe 26 into the interior of the transfer member simultaneously with the creation in the folder of suction through pipe 27 to cause the carcass to adhere to the folder and permit the transfer member to be lifted upwardly away therefrom. As will be later explained, the telescoping sections of the folder will be held upwardly in extended position by air pressure through pipe 28, exerted against a piston movably mounted within the depending cylinder 29 closed at its lower end. The folder will now be moved to the right in Fig. 1 by any suitable power exerted through rod 30, which power may be used for moving the folder carriage 24 on track 25 in either direction. The folder now being away from below the transfer member, the felter with a new carcass accreted thereon may be again swung into upright position, the transfer member lowered thereover and the cycle repeated.

The transfer member indicated generally at 19 comprises side walls 31 of tubular or other cross section closed at the upper end by a plate 32, and having extending inwardly at the bottom the portion 33 with the downwardly extending annular flange 34. The transfer member has adjacent its upper end threaded openings receiving the vacuum pipe 20 and air pipe 26 respectively. Affixed to the flange 34 and extending upwardly on the interior of the transfer member is a tubular member 35 of a shape similar to that of the felter, but of a slightly larger diameter at the various stepped sections in order to receive between the tubular portion 35 and the felter wall 13, the carcass 16 of the filter being formed. The tubular interior walls 35 of the transfer member are provided with a large number of openings 36, through which the suction in the interior space 37 may be exerted through pipe 20 and when the suction is cut off, air pressure from pipe 26 may be exerted through openings 36 to loosen the carcass from the transfer member, as will be readily understood from the foregoing.

The folder is shown in detailed vertical section in Fig. 9, and comprises the bottom preferably cylindrical portion 38 having at its upper edge the annular flange 39 and at its interior a plurality of telescoping members which for illustrative purposes are shown as being eight in number and identified as 40, 41, 42, 43, 44, 45, 46 and 47, which are shown in Fig. 9 as being in extended position, and in Fig. 13 in collapsed position. The section 40 remains inside of the cylindrical portion 38, whereas the sections 41 to 47 are telescopically movable with respect to each other as they are extended or lowered as later explained. The section 40 has fixed near its upper end an outwardly extending annular flange 48 and is prevented from moving out of cylindrical portion 38 by flange 48 bearing against flange 39. Section 40 also has formed at its lower end an outwardly extending flange 49 resting on the bottom of the interior of the cylindrical portion 38. Referring to Fig. 13, which shows the telescopic sections as all being in their lowered position, it will be seen that the section 40 is also provided near its upper end with an inwardly extending flange 50 in horizontal alignment with the flange 48. As each of sections 41, 42, 43, 44, 45 and 46 are alike, except for differences in diameter, only one need be explained as the others are constructed and operate similarly, except for occupying higher positions when extended. As seen in Fig. 13, section 41 is formed at its lower end with the outwardly extending flange 51, intermediate of its height with an outwardly extending flange 52, and a distance below its upper end with an inwardly extending flange 53, the outer face of the upper end of section 41 above flange 53 being slightly upwardly and inwardly tapered. Each of flanges 51 and 52 have close but sliding fit on the interior surface of the section 40, permitting section 41 to move upwardly as later explained until flange 52 strikes the lower edge of flange 50 of section 40, thus stopping further upward movement of section 41. Section 42 is likewise permitted to move upwardly as later explained, until its flange corresponding with flange 52, strikes the lower edge of flange 53. Each of the other sections 43, 44, 45 and 46 have a similar upward movement with their flange corresponding to flange 52, striking the lower edge of the flange corresponding to flange 53. The center section 47 is formed at its lower end with a flange 54, and intermediate of its height with a flange 55. Similarly, when section 47 moves upwardly as later explained, its flange 55 will strike the lower edge of the next adjacent flange corresponding to flange 53 of section 41. From this it will be seen that as the various telescopic sections move upwardly into extended position, they will each through their intermediate flange be stopped in such upward movement by the flange corresponding to flange 53 of the next larger section until the parts are finally extended to their maximum degree as shown in Fig. 9, each of the several flanges or annular ribs 52 of each of the sections having a close but sliding fit upon the inner wall surface of the next larger section. Each of the sections 41 to 46 have fixed at their bottom edge an inwardly extending flange 56 which extends inwardly a sufficient distance to close any gap that may exist between the outer edge of any of the flanges 51, 54, and the inner surface of its next larger section. Thus, when the various sections are in collapsed position as shown in Fig. 13, these annular flanges 56 will extend inwardly a slight distance over the joint between the bottom edges of the various sections to prevent air leakage between the various sections when the sections are collapsed, these flanges 56 also being of such thickness as to cause the upper ends of all of the sections to fall in a horizontal plane when the device is standing in a vertical position.

Depending from the base 57 of the cylindrical portion 38 is a cylinder 29 as shown in Fig. 9 which can be of any suitable length to accommodate the vertical movement of the telescoping sections. Cylinder 29 is closed at its lower end by a plate 59 having an angular opening 60 into which is threadably connected the pipe 28 leading to any suitable source of compressed air. Also slidably mounted in cylinder 29 is a piston head 63 to which is fixed the upstanding piston rod 64 which at its upper end (see Fig. 13) is fixed to the interior upper end of the section 47 at 65, by pinning, pressed fit, or otherwise as desired. For convenience, the cylinder 29 in Fig. 9 is shown as partly broken away, but it will be understood that the same will be of a length to give the necessary vertical movement to the piston rod 64 to enable collapsing, as well as desired extension of the telescoping sections. Upward movement to extend the sections will be given to the piston head 63 and piston rod 64 by admitting air pressure through pipe 28, and when it is desired to collapse the sections, such air pressure will be cut off and released from the interior of cylinder 29. If the weight of the various sections and the limpness of the carcass is such as to enable collapsing to be effected by gravity, it will merely be necessary to vent the air from the interior of cylinder 29 below the piston head 63. If, however, more collapsing power is needed, the interior of cylinder 29 below piston head 63 may be subjected to suction through pipe 28 from any suitable source of supply by manipulation of a two-way valve (not shown).

The cylindrical base portion 38 has a threaded opening through its wall near the lower end to threadably receive the pipe 27 which may be connected to any suitable source of suction to apply suction to the annular interior space 67 between section 40 and cylindrical base portion 38. As will be seen in Figs. 9 and 13, the telescoping sections 41—47 are formed with a number of lateral openings, which in each section are arranged in two vertically spaced apart series, the holes of each series being circumferentially spaced apart and of a size to readily permit the application therethrough of the suction in the interior of the folder, said suction acting through said holes, and grooves later described, to cause the filter carcass on the outside of the folder to grip the folder sections during the folding action. These series of holes are so spaced apart vertically that in each section one series is positioned above the outwardly extending intermediate flanges 52 and one series therebelow, and so arranged that when the sections are fully extended the holes in the lower series of one section will fall opposite the holes in the upper series of the adjacent section. These holes are indicated in Fig. 9 as 40L for the holes in the lower series of section 40, 40u for the holes in the upper series of section 40, 41L for the holes in the lower series of section 41, 41u for the holes in the upper series of section 41, the holes in the remaining telescoping sections being indicated 42L and 42u for the lower and upper series respectively of section 42, 43L and 43u for the lower and upper series respectively of section 43, and so on in similar manner to and including the center section 47.

Each of the sections 41 to 47 is formed on its outer surface with a plurality of circumferentially spaced, longitudinally extending grooves 67 having communication with the holes of the upper series and extending longitudinally a distance above and below such upper holes in each section, as seen in Fig. 11 in which a typical longitudinally movable section is shown which for illustrative purposes has been indicated as section 42. The longitudinal grooves 67 are also cut through the intermediate ribs 52' of all of the movable sections so that the effect of the suction will be applied both above and below these ribs to better grip the filter carcass during folding by suction through pipe 27 and holes 40L—47u.

As is shown in Fig. 13, when the telescoping sections 41—47 are in completely collapsed position, the upper ends thereof together with the upper end of the stationery outer section 40 all fall in substantially the same horizontal plane and extend a substantial distance upwardly above the flange 39 of the cylindrical portion 38. The outer faces of these upstanding projections 68 are upwardly and inwardly inclined so that when the sections are completely extended these inclined projections will present a generally conical surface as seen in Fig. 9. The inside faces of the projections 68 are tapered upwardly and outwardly. As will be understood, when the telescoping sections are completely collapsed, the filter carcass will be folded into the spaces between the projections 68.

Figures 17, 18:
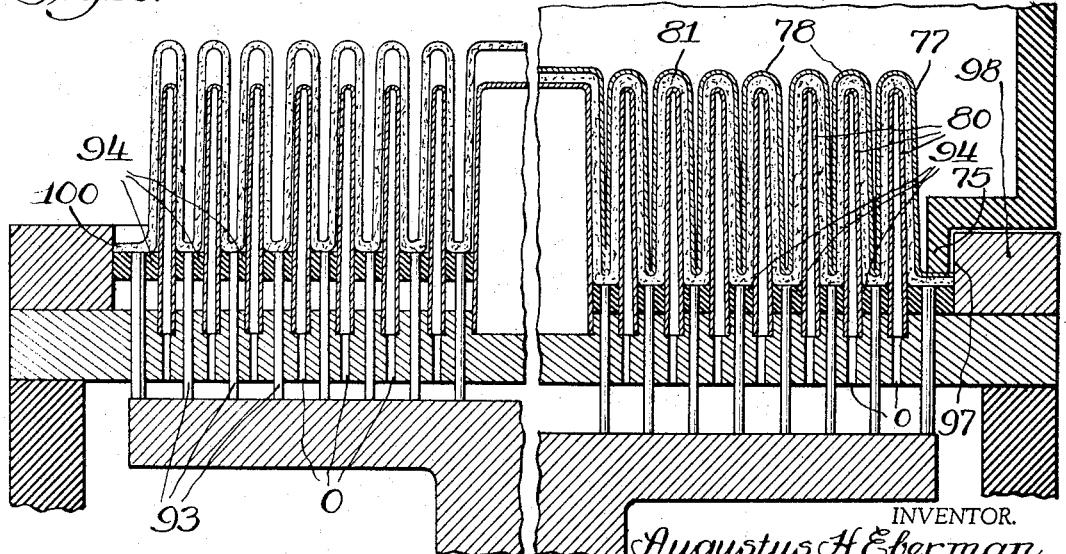
Fig. 17 is a fragmentary vertical section through one-half of the drawing form showing the filter carcass and the folded filter transfer in position thereon.
Fig. 18 is a view similar to Fig. 17 of the opposite half, but showing the knock-ring in elevated position to loosen the filter carcass from the drying form after the folded filter transfer has been removed from the carcass and the carcass dried.

In order to remove the folded carcass from the collapsed sections, I have provided a folded filter transfer 69 (see Fig. 14) having side walls 70 of cylindrical or other desired cross section, there being fixed to the upper edge of these side walls the top plate 71 which is formed with a threaded opening to receive the pipe 72 containing a two-way valve controlling air and suction to the interior 73 of the folded filter transfer. The lower marginal edge of the side walls 70 is extended inwardly at 74 and downwardly to form the flange 75, to the bottom edge of which flange is secured the flange 76 of a perforated metal receiver 77 formed with the alternately upwardly and downwardly bent concentric sections 78, formed at their bottom edges with the annular portions 79 of a size to fit into the bottoms of the valleys in the folded filter as shown in Fig. 17.

Figure 16:
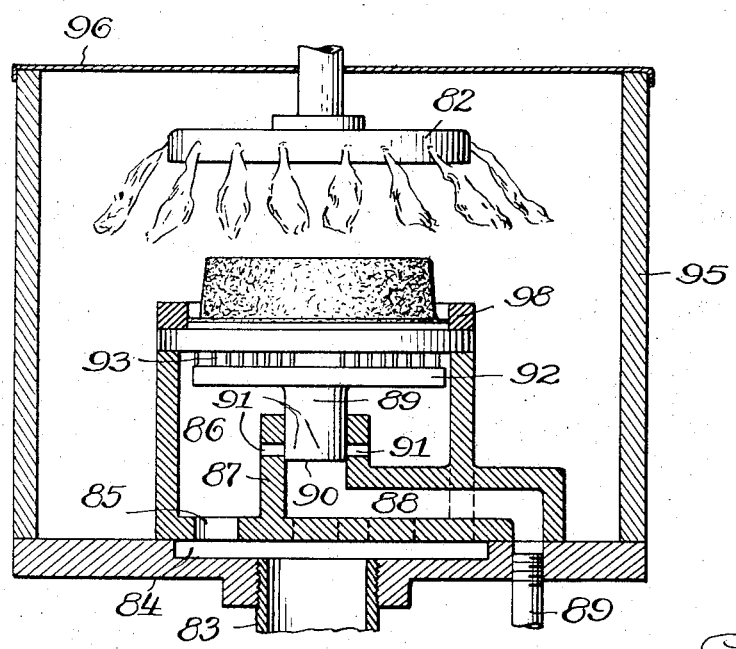
Fig. 16 is a vertical section on a median plane through the drying chamber showing a folded filter carcass being dried therein.

The thin metal of the receiver 77 being perforated will under action of the suction through pipe 72 in space 73 grip the folded filter and lift it from the collapsed folder shown in Fig. 13, the suction within the folder of Fig. 13 having at that time been changed to air pressure if desired. The folded carcass is then transferred to the drying form shown in Figs. 17 and 16. Fig. 17 shows the folded carcass immediately after being positioned on the complemental projections 80, the folded carcass being indicated in Fig. 17 at 81. The suction is then cut off through pipe 72 and air pressure introduced into the space 73 and through the projections in section 78 so as to tend to force the carcass away from the sections of the folded filter transfer so as to leave said carcass upon the drying form. The drying form is then subjected to heat from the heating element 82 shown in Fig. 16 to dry the carcass. As soon as the folded filter carcass is deposited upon the drying form the transfer 69 is then removed therefrom prior to the application of heat to the carcass. When removing transfer 69 from the drying form, a vacuum will be introduced through the pipe 83, through passageways 84 and 85 to the interior 86 of the drying form as seen in Fig. 16. This suction is applied through openings o to the interior of the perforated drying form annular sections 80 to cause the carcass 81 to be gripped against the drying form through the perforations in the projections 80.

Formed on the interior of the drying form is a cylinder 87 whose interior is in communication with the passageway 88, to the outer end of which is fixed the air pipe 89 connected to a suitable supply of compressed air. Vertically movable in cylinder 87 is the piston 89, the bottom end 90 of which is slightly below the lower edge of the circumferentially spaced openings 91. Fixed to the upper end of the piston 89 is an enlarged disk 92, fixed to which and extending upwardly therefrom are pins or rods 93 to move therewith as the piston is moved upwardly and downwardly.

Fixed to the upper end of each of rods 93 is an annular knock ring 94 to move therewith in unison with the movement of the piston 89, there being a knock ring immediately below the lower end of each of the sections 81 of the folded filter carcass 81. The purpose of these knock rings is to push the filter carcass upwardly to loosen it from between the sections 80 of the drying form to overcome any tendency of the folded carcass from sticking thereto after drying and to facilitate its quick removal and the placing of another folded carcass onto the drying form to be dried. As will be understood, the suction in space 86 in the drying form will be cut off before elevation of piston 89 to loosen the dried filter carcass from the drying form by means of the knock rings referred to above.

Fig. 17 shows the folded carcass in position on the sections 80 of the drying form, and the folded filter transfer in place thereover, these parts being in the position they assume immediately after the folded carass has been placed by the transfer onto the drying form. As stated, the sections 80 of the drying form are perforated to permit the suction in the space 86 to cause the carcass to be gripped onto the drying form while the sections 78 of the transfer are being removed therefrom. Also, if desired, while this suction is cut off during operation of the knock rings 94, air pressure may be introduced into the space 86 to assist the operation of the knock rings in loosening the carcass from the drying form. The knock rings are shown in their lowered position in Fig. 17, and in their elevated position in Fig. 18, it being understood that in Fig. 18 the transfer member 69 has already been removed from the folded carcass and the drying completed in the drying oven 95 of Fig. 16. This drying oven may have a removable lid 96 detachably connected thereto to permit the introduction and removal into the oven of the heat producing means 82. Any other form of drying oven, however, may be used as desired.

As will be understood, the removable lid 96 and the heating means 82 will be removed from the drying oven 95 prior to the removal of the dried carcass and introduction of a new wet carcass, the application to the drying form of a new wet carcass being effected by lowering onto the drying form the transfer 69 carrying the wet carcass to be dried as explained above and shown in detail in Fig. 14. Elevation of piston 89 and knock rings 94 will be effected by air pressure through pipe 89 at the desired time, the extent of vertical movement of piston 89 being limited by exhausting or relief of the air pressure from the cylinder when the bottom 90 of the piston 89 is elevated sufficiently to open the bottom portions of the lateral openings 91 in the cylinder wall. Only a slight upward movement of the knock rings is required as the removal of the dried carcass from the drying form may be effected by merely an upward knock or push. Just prior to the application of a new wet carcass onto the drying form, the air pressure in cylinder 87 will be discontinued so that the piston 89, disk 92 and the knock rings will move downwardly under gravity into the position shown in Fig. 17 to be ready to receive another wet carcass. As will be seen in Fig. 17, the folded filter transfer will be guided into proper position within the drying form by the downwardly extending flange 75 fitting into the annular opening formed by the inner face 97 of the flange 98 of the drying form.

The parts of the porous felting former, the parts contacting the wet carcass for the first transfer of the unfolded carcass and of the folded carcass transfer, as well as the folding device and the parts in contact with the wet carcass of the drying form will preferably be made of copper, brass, bronze or other suitable non-corrodible material to prevent corrosion. As will be understood, however, any of the parts of my apparatus may be made of any suitable material as desired. As will be seen in Figs. 3, 4, 17 and 18, the bottom portion of the filter member will be formed with an outwardly projecting flange 100 to enable the filter to be supported in the casing within which it is to be used.

Having now described my invention, I claim:

1. In apparatus for making folded, accreted, fibrous pulp air filters having large facial area in small space, comprising a folder having a hollow base housing, a plurality of longitudinally movable sections in said housing, each of said sections having near its upper end an inwardly extending annular flange and at an intermediate portion of its height an outwardly extending annular flange, a center longitudinally movable section having an outwardly extending annular flange, that portion of each of said sections above the horizontal plane through the said inwardly extending annular flanges being inclined upwardly and inwardly.

2. In apparatus for making folded, accreted, fibrous pulp air filters having large facial area in small space, comprising a folder having a hollow base housing, a plurality of longitudinally movable sections in said housing, each of said sections having near its upper end an inwardly extending annular flange and at an intermediate portion of its height an outwardly extending annular flange, a center longitudinally movable section having an outwardly extending annular flange, that portion of each of said sections above the horizontal plane through the said inwardly extending annular flanges being inclined upwardly and inwardly, said sections being movable outwardly of the base housing until the intermediate flanges each engages the upper flange of the next outward section and said extended inclined upper ends of the sections form a generally conical outer surface.

3. In apparatus for making folded, accreted, fibrous pulp air filters having large facial area in small space, comprising a folder having a hollow base housing, a plurality of longitudinally movable sections in said housing, each of said sections having near its upper end an inwardly extending annular flange and at an intermediate portion of its height an outwardly extending annular flange, a center longitudinally movable section having an outwardly extending annular flange, that portion of each of said sections above the horizontal plane through the said inwardly extending annular flanges being inclined upwardly and inwardly, said sections being movable outwardly of the base housing until the intermediate flanges each engages the upper flange of the next outward section and said extended inclined upper ends of the sections form a generally conical outer surface, the bottoms of each of said sections forming stops within the base housing when the sections are collapsed thereinto.

4. In apparatus for making folded, accreted, fibrous pulp air filters having large facial area in small space, comprising a folder having a hollow base housing, a plurality of longitudinally movable sections in said housing, each of said sections having near its upper end an inwardly extending annular flange and at an intermediate portion of its height an outwardly extending annular flange, a center longitudinally movable section having an outwardly extending annular flange, that portion of each of said sections above the horizontal plane through the said inwardly extending annular flanges being inclined upwardly and inwardly, said sections being movable outwardly of the base housing until the intermediate flanges each engages the upper flange of the next outward section and said extended inclined upper ends of the sections form a generally conical outer surface, the bottoms of each of said sections forming stops within the base housing, and the inclined upper ends of the sections above the upper flanges projecting a substantial distance above the upper edge of said base housing, when the sections are completely collapsed into the housing.

5. In a folder for folding accreted, contoured, fibrous pulp carcasses for making filters having large facial area in small space, comprising a hollow base housing having a base and side walls, a plurality of concentric sections telescopically mounted for sliding movement one within another, means for causing said sections to move progressively outwardly a limited distance with relation to each other and to said base housing, means for stopping said sections when fully collapsed, the outer end portions of said sections when collapsed protruding longitudinally outward beyond the adjacent edge of the base housing and being inclined toward the axis in a longitudinal direction on the outer side, and inclined away from the axis in the same longitudinal direction on the inner side.

6. In a folder for folding accreted, contoured, fibrous pulp carcasses for making filters having large facial area in small space, comprising a hollow base housing having a base and side walls, a plurality of concentric sections telescopically mounted for sliding movement one within another, means for causing said sections to move progressively outwardly a limited distance with relation to each other and to said base housing, means for stopping said sections when fully collapsed, the outer end portions of said sections when collapsed protruding longitudinally outward beyond the adjacent edge of the base housing and being longitudinally inclined on both their outer and inner faces, the inner ends of said sections also being in a common plane when collapsed.

7. In a folder for folding accreted, contoured, fibrous pulp carcasses for making filters having large facial area in small space, comprising a hollow base housing having a base and side walls, a plurality of concentric sections telescopically monuted for sliding movement one within another, means for causing said sections to move progressively outwardly a limited distance with relation to each other and to said base housing, means for stopping said sections when fully collapsed, the outer end portions of said sections when collapsed protruding longitudinally outward beyond the adjacent edge of the base housing and being inclined toward the axis on the outer face, some of said sections having circumferentially spaced, longitudinally extending grooves in their outer faces.

8. In apparatus for making folded, accreted, contoured fibrous pulp filters, a drying form for holding a folded accreted fibrous pulp carcass, comprising a hollow body having a top plate provided with upstanding concentric radially spaced projections with intervening valleys for receiving the folded carcass, knock rings movably mounted in the bottoms of the valleys between said projections, and means for moving said knock rings upwardly to loosen the dried filter from said projections.

9. In apparatus for making folded, accreted, contoured fibrous pulp filters, a drying form for holding a folded accreted fibrous pulp carcass, comprising a hollow body having a top plate provided with upstanding concentric radially spaced projections for receiving the folded carcass, knock rings movably mounted in the bottoms of the spaces between said projections, and means for moving said knock rings upwardly to loosen the dried filter from said projections, said knock rings being of annular shape and each having downwardly extending pins fixed thereto, and means for simultaneously forcing said pins upwardly after the carcass is dried to loosen the same.

10. In apparatus for making folded, accreted, contoured fibrous pulp filters, a drying form for holding a folded accreted fibrous pulp carcass, comprising a hollow body having a top plate provided with upstanding concentric radially spaced projections for receiving the folded carcass, knock rings movably mounted in the bottoms of the spaces between said projections, and means for moving said knock rings upwardly to loosen the dried filter from said projections, said knock rings being of annnular shape and each having downwardly extending pins fixed thereto, means for simultaneously forcing said pins upwardly after the carcass is dried to loosen the same, a cylinder and piston in said hollow body, a plate connected to move with the piston, said pins being fixed at one end to said last mentioned plate, and means for causing movement of said piston when desired to loosen the dried carcass.

11. In combination in apparatus for making a folded fibrous pulp filter, a folded carcass hollow transfer device and a drying form, the transfer device having perforated projections of a shape corresponding to the shape of the upper side of the carcass, means for creating a suction within the transfer device to hold the folded carcass thereagainst, the drying form having upstanding perforated projections of a shape corresponding to the shape of the under side of the carcass, and means for loosening the carcass from the drying form after drying.

12. In combination in apparatus for making a folded fibrous pulp filter, a folded carcass hollow transfer device and a drying form, the transfer device having perforated projections of a shape corresponding to the shape of the upper side of the carcass, means for creating a suction within the transfer device to hold the folded carcass thereagainst, the drying form having upstanding perforated projections of a shape corresponding to the shape of the under side of the carcass, and means for loosening the carcass from the drying form after drying, said last mentioned means comprising knock rings in the bottoms of the spaces between the projections of the drying form, and means for moving the knock rings with relation to the drying form projections.

13. In an accreted, fibrous pulp filter folder, a section having cylindrical side walls, an outwardly extending annular flange on the bottom end thereof, an outwardly extending annular rib intermediate the ends of said section, and an upwardly and inwardly tapering upper end for contacting a portion of the filter during folding.

14. In an accreted, fibrous pulp filter folder, a section having cylindrical side walls, an outwardly extending annular flange on the bottom end thereof, an outwardly extending annular rib intermediate the ends of said section, and an upwardly and inwardly tapering upper end for contacting a portion of the filter during folding, said side walls having formed therein and in said intermediate rib, a plurality of circumferentially spaced longitudinally extending grooves.

15. In an accreted, fibrous pulp filter folder, a section having cylindrical side walls, an outwardly extending annular flange on the bottom end thereof, an outwardly extending annular rib intermediate the ends of said section, and an upwardly and inwardly tapering upper end for contacting a portion of the filter during folding, said side walls having formed therein and in said intermediate rib, a plurality of circumferentially spaced longitudinally extending grooves, said side walls also being formed with openings communicating with said grooves.

16. In apparatus for forming folded accreted fibrous pulp filters, a folder comprising a hollow housing, a plurality of longitudinally movable sections in said housing capable of being extended to a limited extent, and collapsed, said sections when collapsed having protruding ends extending beyond the end of the housing, said protruding ends being upwardly and inwardly tapered on their outer sides.

17. In apparatus for making folded, accreted, fibrous pulp filters having a large facial area in a small space, comprising a folder having a hollow base housing, a plurality of longitudinally movable sections in said housing, each of said sections having near its upper end an inwardly extending annular flange and at an intermediate portion of its height an outwardly extending annular flange, a center longitudinally movable section having an outwardly extending annular flange, that portion of each of said sections above the horizontal plane through the said inwardly extending annular flanges being inclined upwardly and inwardly, said sections being movable outwardly of the base housing until the intermediate flanges each engages the upper flange of the next outward section and said extended inclined upper ends of the sections form a generally conical outer surface, the bottoms of each of said sections forming stops within the base housing, and the inclined upper ends of the sections above the upper flanges projecting a substantial distance above the upper edge of said base housing, when the sections are completely collapsed into the housing, some of said sections having circumferentially spaced, longitudinally extending grooves in their outer faces, and means for creating a suction on the interior of the sections when extended and through openings in the section walls to said grooves to cause a carcass when in position on the extended folder to grip a portion of the outside of the sections and be longitudinally folded when the sections are collapsed.

AUGUSTUS H. EBERMAN.